(12) United States Patent
Matsuo et al.

(10) Patent No.: US 10,200,704 B2
(45) Date of Patent: Feb. 5, 2019

(54) IMAGE DECODING APPARATUS AND METHOD

(71) Applicant: KABUSHIKI KAISHA TOSHIBA, Minato-ku (JP)

(72) Inventors: Takuya Matsuo, Fuchu (JP); Takayuki Itoh, Kawasaki (JP); Takashi Watanabe, Yokohama (JP); Atsushi Matsumura, Yokohama (JP); Tomoya Kodama, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 285 days.

(21) Appl. No.: 15/056,148

(22) Filed: Feb. 29, 2016

(65) Prior Publication Data

US 2016/0316202 A1 Oct. 27, 2016

(30) Foreign Application Priority Data

Apr. 24, 2015 (JP) ................... 2015-089710

(51) Int. Cl.
*H04N 19/423* (2014.01)
*H04N 19/82* (2014.01)

(52) U.S. Cl.
CPC ........... *H04N 19/423* (2014.11); *H04N 19/82* (2014.11)

(58) Field of Classification Search
CPC .............................. H04N 19/423; H04N 19/82
USPC ..................................... 375/240.16
See application file for complete search history.

(56) References Cited

U.S. PATENT DOCUMENTS

| 5,801,776 A | 9/1998 | Tamura et al. |
| 6,333,951 B1 | 12/2001 | Tamura et al. |
| 2004/0005006 A1 | 1/2004 | Miura et al. |
| 2004/0076237 A1 | 4/2004 | Kadono et al. |
| 2014/0254676 A1* | 9/2014 | Jiang .................... H04N 19/124 375/240.12 |

FOREIGN PATENT DOCUMENTS

| JP | 3058559 | 7/2000 |
| JP | 3769534 | 4/2006 |
| JP | 3981651 | 9/2007 |
| JP | 4114494 | 7/2008 |
| JP | 2014-030234 A | 2/2014 |

(Continued)

OTHER PUBLICATIONS

Andrey Norkin et al. "HEVC Deblocking Filter", IEEE Transactions on Circuits and Systems for Video Technology, vol. 22, No. 12, Dec. 2012, 9 Pages.

*Primary Examiner* — Jeffery A Williams
(74) *Attorney, Agent, or Firm* — Oblon, McClelland, Maier & Neustadt, L.L.P.

(57) ABSTRACT

According to an embodiment, an image decoding apparatus includes a memory, a decoder and a first filter. The memory stores reference pixels based on pixels included in a decoded pixel block. The decoder decodes encoded data in units of pixel blocks using the reference pixels to generate a first decoded pixel block, the first decoded pixel block being adjacent to the reference pixels. The first filter performs a first filtering on only the first decoded pixel block using the first decoded pixel block and part of the reference pixels perpendicularly adjacent to the first decoded pixel block in a scan direction of image decoding processing.

11 Claims, 9 Drawing Sheets

(56) References Cited

FOREIGN PATENT DOCUMENTS

| | | | |
|---|---|---|---|
| JP | 2014-197847 | A | 10/2014 |
| JP | 2014-534744 | A | 12/2014 |
| JP | 2015-076781 | A | 4/2015 |

\* cited by examiner

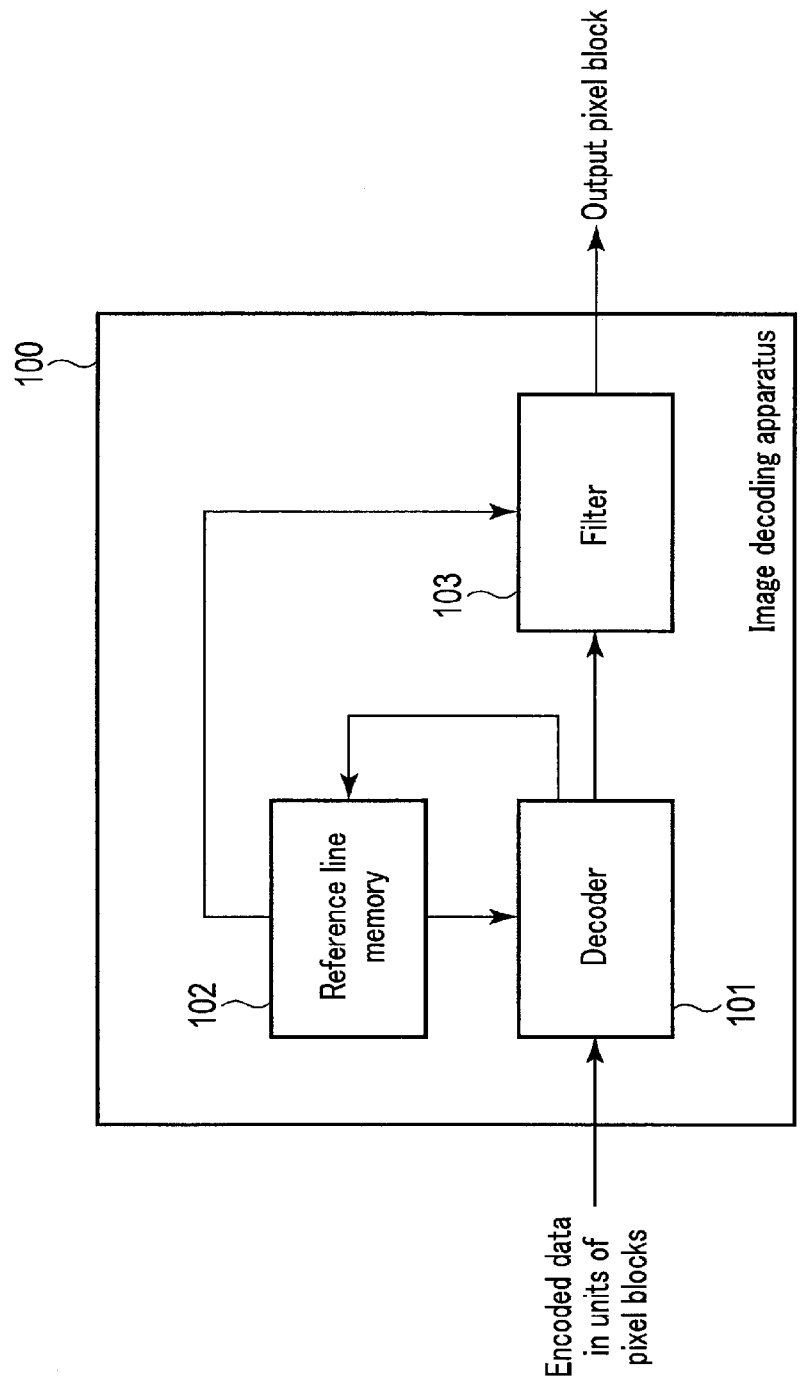
F I G. 1

| P(0,0) | P(1,0) | P(2,0) | P(3,0) |
|--------|--------|--------|--------|
| Q(0,0) | Q(1,0) | Q(2,0) | Q(3,0) |
| Q(0,1) | Q(1,1) | Q(2,1) | Q(3,1) |
| Q(0,2) | Q(1,2) | Q(2,2) | Q(3,2) |
| Q(0,3) | Q(1,3) | Q(2,3) | Q(3,3) |

F I G. 3

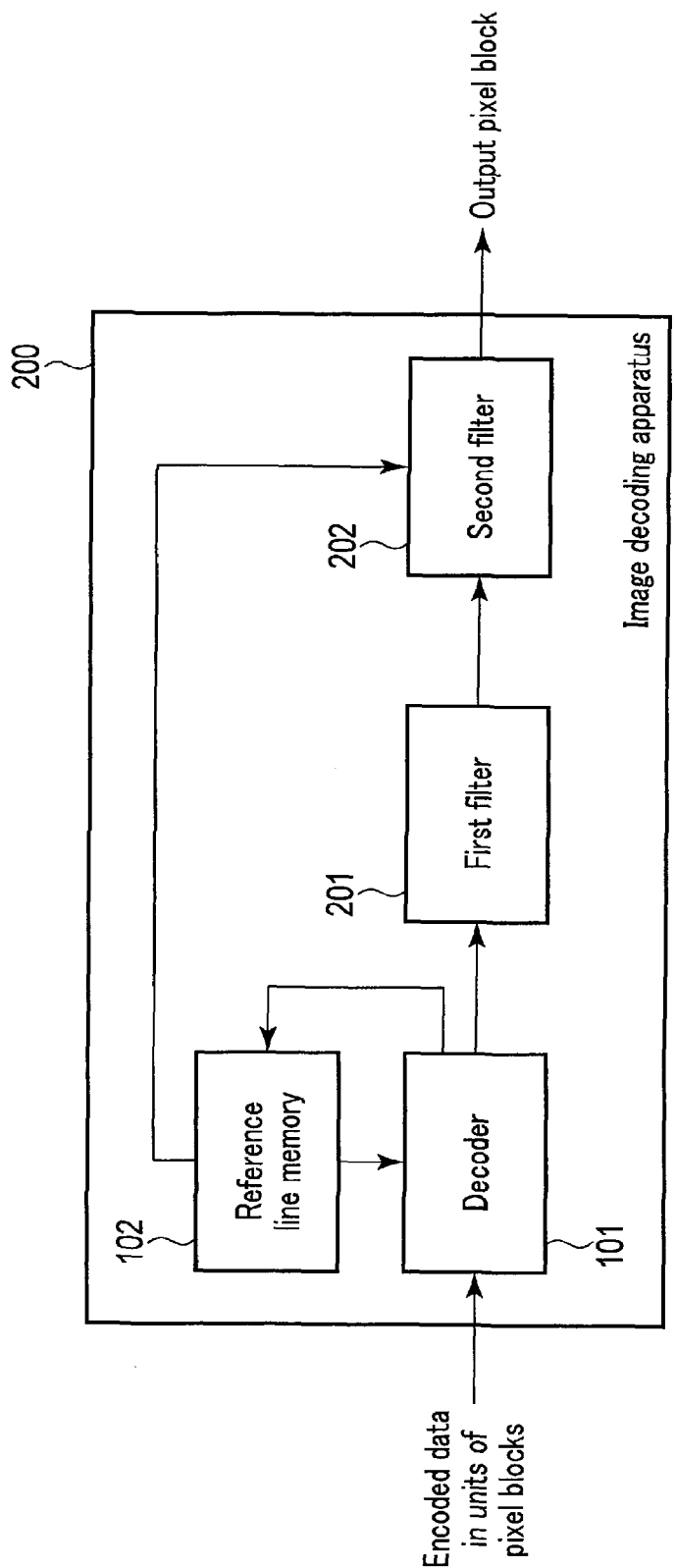
F I G. 4

| P(3,0) | P(2,0) | P(1,0) | P(0,0) | Q(0,0) | Q(1,0) | Q(2,0) | Q(3,0) |
|---|---|---|---|---|---|---|---|
| P(3,1) | P(2,1) | P(1,1) | P(0,1) | Q(0,1) | Q(1,1) | Q(2,1) | Q(3,1) |
| P(3,2) | P(2,2) | P(1,2) | P(0,2) | Q(0,2) | Q(1,2) | Q(2,2) | Q(3,2) |
| P(3,3) | P(2,3) | P(1,3) | P(0,3) | Q(0,3) | Q(1,3) | Q(2,3) | Q(3,3) |

F I G. 5

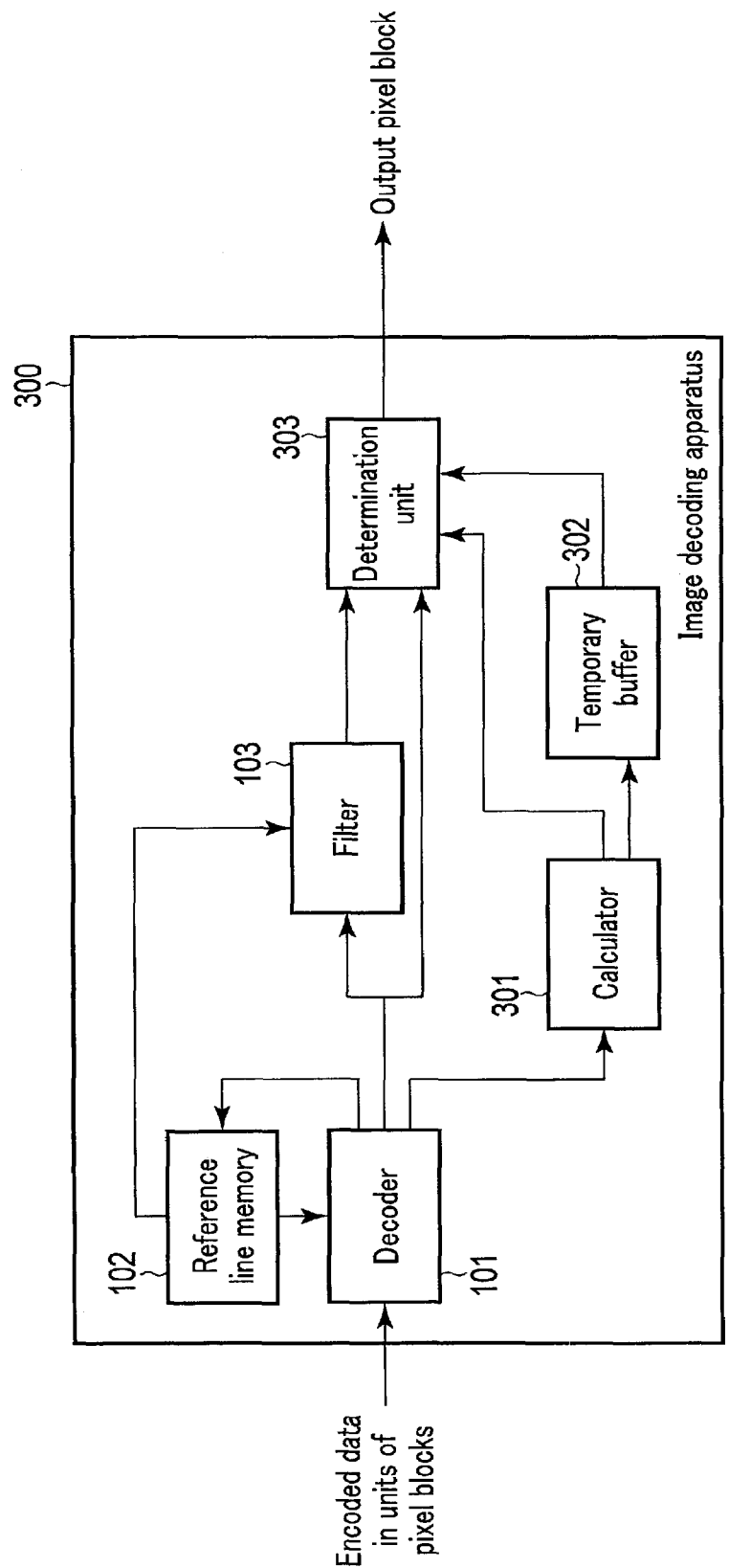
F I G. 6

| Q(0,0) | Q(1,0) | Q(2,0) | Q(3,0) |
|--------|--------|--------|--------|
| Q(0,1) | Q(1,1) | Q(2,1) | Q(3,1) |
| Q(0,2) | Q(1,2) | Q(2,2) | Q(3,2) |
| Q(0,3) | Q(1,3) | Q(2,3) | Q(3,3) |

F I G. 7A

| Q(0,0) | Q(1,0) | Q(2,0) | Q(3,0) |
|--------|--------|--------|--------|
| Q(0,1) | Q(1,1) | Q(2,1) | Q(3,1) |
| Q(0,2) | Q(1,2) | Q(2,2) | Q(3,2) |
| Q(0,3) | Q(1,3) | Q(2,3) | Q(3,3) |

IMAGE DECODING APPARATUS AND METHOD

CROSS-REFERENCE TO RELATED APPLICATIONS

This application is based upon and claims the benefit of priority from Japanese Patent Application No. 2015-089710, filed Apr. 24, 2015, the entire contents of which are incorporated herein by reference.

FIELD

Embodiments described herein relate generally to an image decoding apparatus and method.

BACKGROUND

It is known that block distortion that is perceived in a shape of pixel blocks occurs in a decoded image obtained by decoding the pixel blocks encoded in units of blocks. Such block distortion deteriorates a subjective image quality. Deblocking filters have been presented as a method for reducing such distortion.

Deblocking filters have been introduced into the moving image compression encoding standards such as H.264/AVC (ITU-T H.264|ISO/IEC 14496-10 Advanced Video Coding) and H.265/HEVC (ITU-T H.265|ISO/IEC 23008-2 High Efficiency Video Coding). Deblocking filters used in these standards perform filtering to change the pixel values for the respective pixels adjacent to the boundary of the pixel block. Because image decoding apparatuses equipped with such deblocking filters also perform filtering on a pixel block that is positioned on the upper side of the pixel block being processed, output delay occurs.

A method is known as another image decoding apparatus. In the method, pixel values are referred to in the deblocking filter, and the pixels on which processing is performed are reduced. The image decoding apparatus can reduce the scale of the memory circuit and simplify the processing, but requires an independent memory for referring to pixels necessary for filtering. In addition, the image decoding apparatus still causes the output delay described above.

BRIEF DESCRIPTION OF THE DRAWINGS

FIG. 1 is a block diagram illustrating an image decoding apparatus according to a first embodiment;

FIG. 3 is a diagram illustrating a positional relation between a pixel block and a reference line memory;

FIG. 4 is a block diagram illustrating an image decoding apparatus corresponding to a modification of the image decoding apparatus according to the first embodiment;

FIG. 5 is a diagram illustrating a positional relation between a pixel block Q and a pixel block P decoded directly before the pixel block Q;

FIG. 6 is a block diagram illustrating an image decoding apparatus according to a second embodiment;

FIG. 7A is a diagram illustrating a positional relation of pixels used in a calculator in FIG. 6;

FIG. 7B is a diagram illustrating a positional relation of pixels used in the calculator in FIG. 6;

FIG. 9 is a diagram illustrating a positional relation of pixels used in a calculator in FIG. 8.

DETAILED DESCRIPTION

Figure 2:
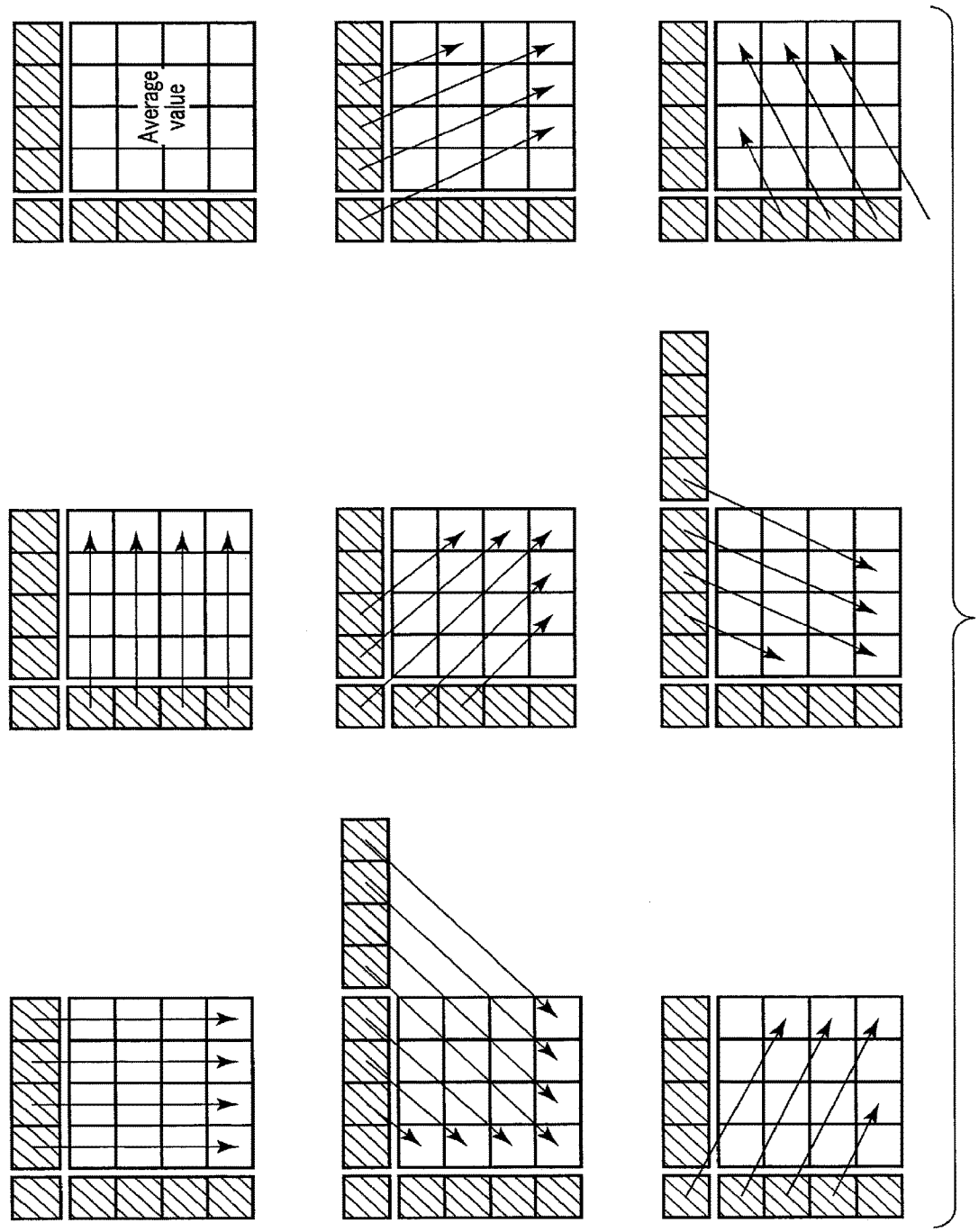
FIG. 2 is a diagram illustrating a method for intra prediction of 4×4 pixels in H.264/AVC.

Embodiments will be explained hereinafter with reference to the drawings.

According to an embodiment, an image decoding apparatus includes a memory, a decoder and a first filter. The memory stores reference pixels based on pixels included in a decoded pixel block. The decoder decodes encoded data in units of pixel blocks using the reference pixels to generate a first decoded pixel block, the first decoded pixel block being adjacent to the reference pixels. The first filter performs a first filtering on only the first decoded pixel block using the first decoded pixel block and part of the reference pixels perpendicularly adjacent to the first decoded pixel block in a scan direction of image decoding processing.

In the following explanation, constituent elements that are the same as or similar to the explained elements will be denoted by the same or similar reference numerals, and overlapping explanation thereof will be basically omitted.

In the following explanation, suppose that processing is performed on units of pixel blocks of 4×4 pixels, and processing is performed in the order of raster scan as the processing order (also referred to as scan direction). The processing in the order of raster scan indicates performing processing in units of pixel blocks from the upper left of the image in the right direction, moving to the next lower pixel block when the processing is performed to the upper right part, and performing processing from the left to the right in the same manner.

However, the size of the pixel block and the processing order are not limited thereto, but processing may be performed with various sizes and in various processing orders. For example, the size of the pixel block may be the size of macroblocks, each of which is formed of a plurality of pixel blocks and used in H.264/AVC or the like. In addition, the pixel blocks may be processed in the processing order in which the pixel blocks are processed from the upper right of the image in the lower direction, and the processing is moved to the next left block when the processing is performed to the lower right part, and processing is performed from the top block to the bottom block in the same manner. As another example, the processing may be performed in the order of a spiral pattern starting from the pixel block located around the center of the picture.

In addition, the terms indicating the positional relation such as "upper", "lower", "left", "perpendicular", and "horizontal" are described based on the processing in the order of the raster scan. However, the terms indicating the positional relations may be properly changed according to the processing order or the direction in which the image is viewed.

(First Embodiment)

As illustrated in FIG. 1, an image decoding apparatus 100 according to a first embodiment includes a decoder 101, a reference line memory 102, and a filter 103. The image decoding apparatus 100 is implemented by a circuit that performs decoding processing performed by the decoder 101, an image decoding LSI formed of an SRAM and a DRAM serving as the reference line memory 102, and a circuit that performs filtering performed by the filter 103.

The decoder 101 receives encoded data encoded in units of pixel blocks. The decoder 101 decodes the encoded data in units of pixel blocks using reference pixels (described later) based on pixels included in a pixel block that has already been decoded, to generate a decoded pixel block.

The decoder 101 outputs the decoded pixel block to the reference line memory 102 and the filter 103. Otherwise, the decoder 101 may output part of pixels included in the decoded pixel block to the reference line memory 102.

Specifically, the decoder 101 refers to reference pixels located on the upper side of the pixel block to be decoded and pixels included in the previously decoded pixel block and located on the left of the pixel block to be decoded, and generates a predicted pixel block from the encoded data. The decoder 101 also adds a residual pixel block decoded by using the encoded data to the predicted pixel block, to generate a decoded pixel block. The pixels included in the previously decoded pixel block may be stored in a temporary buffer (such as a flip-flop) of the decoder 101. In the following description, explanation of the processing related to generation of a predicted pixel block and a residual pixel block in the decoder 101 will be omitted, because the processing can be achieved by using a general method used in image decoding processing.

For example, as illustrated in FIG. 2, the decoder 101 may perform decoding processing using an intra prediction method of 4×4 pixels used in H.264/AVC. FIG. 2 illustrates a method of referring to pixels (shaded pixels in FIG. 2) adjacent to a pixel block of 4×4 pixels, and predicting pixels of the pixel block along the directions of arrows from the respective shaded pixels indicating starting points of the arrows, and a method of predicting the pixels from the average value of the pixel block.

Otherwise, the decoder 101 may perform decoding processing using various intra prediction methods used in H.264/AVC or H.265/HEVC. The decoder 101 may perform decoding processing using another prediction method (such as inter-picture prediction) for part of the pixel block.

The reference line memory 102 receives the decoded pixel block from the decoder 101. Otherwise, the reference line memory 102 may receive part of the pixels included in the decoded pixel block from the decoder 101. The reference line memory 102 stores reference pixels based on the pixel included in the decoded pixel block. The reference line memory 102 outputs the reference pixels to the decoder 101 and the filter 103.

Specifically, as reference pixels, the reference line memory 102 stores at least one line of pixels extending in a scan direction and closest to the pixel block that is not decoded (referred to as a non-decoded pixel block), that is, a one-pixel line. Otherwise, the reference line memory 102 may store two-pixel lines as reference pixels. A line of pixels in the scan direction is also referred to as a pixel line hereinafter. The reference line memory 102 may be mounted as, for example, a semiconductor storage device (such as an SRAM and a DRAM).

The filter 103 receives the decoded pixel block from the decoder 101, and receives reference pixels from the reference line memory 102. The filter 103 performs filtering on the decoded pixel block using the decoded pixel block and part of the reference pixels that are perpendicularly adjacent to the decoded pixel block in the scan direction of the image decoding processing. The term "perpendicularly adjacent to" means being adjacent in the perpendicular direction in the picture. The filter 103 should use at least one line of pixels extending in the scan direction and closest to the decoded pixel block, among the reference pixels. The filter 103 outputs the filtered decoded pixel block to an external device (such as an output buffer and a display device) that is not illustrated, as an output pixel block.

Specifically, the filter 103 performs filtering on a decoded pixel block Q of 4×4 pixels using a pixel line P of 1×4 pixels, as illustrated in FIG. 3. Luminance information of pixels (hereinafter referred to as "pixel value") or the like may be used in the filtering. P(0, 0) illustrated in FIG. 3 indicates a pixel value of a pixel at the position (0, 0) of the pixel line P, and Q(0, 0) indicates a pixel value of a pixel in the position (0, 0) of the decoded pixel block Q. In the following description, a position of a pixel is indicated as "(X, Y)". The filter 103 may perform filtering on pixels included in the pixel block, for example, in accordance with the following Expression (1).

$$Q'(X, Y) = \text{clip}\left( \frac{a(Y) * P(X, 0) + \sum_{y=0}^{3}(b(Y, y) * Q(X, y)) + c(Y)}{a(Y) + \sum_{y=0}^{3} b(Y, y)}, \right. \tag{1}$$
$$\left. Q(X, Y) - tc, Q(X, Y) + tc \right)$$

In the Expression (1), Q'(X, Y) on the left side indicates Q(X, Y) filtered by using P(X, 0). The clip(A, B, C) on the right side indicates clipping a calculated value A with a lower limit value B and an upper limit value C. The calculated value A indicates a pixel value calculated from the filtered pixel. The lower limit value B indicates a value obtained by subtracting a predetermined value tc from a pixel value (Q(X, Y)) of the pixel before filtering. The upper limit value C indicates a value obtained by adding the predetermined value tc to Q(X, Y).

In the expression of the calculated value A, a(Y) indicates a coefficient for P(X, 0), b(Y, y) indicates a coefficient for Q(X, y), and c(Y) indicates an offset in the position of a pixel Y. The coefficient a(Y) is determined by (Y) of Q(X, Y) to be filtered, and the coefficient b(Y, y) is determined by (Y) of Q(X, Y) to be filtered and (y) of Q(X, y) to be referred to. In the expression of the lower limit value B and the expression of the upper limit value C, tc is a value that is defined by the lower limit value B and the upper limit value C, and defines a variation width of the pixel value that is changed by filtering.

The above coefficients and the offset are designed such that the filtering based on the Expression (1) is achieved by a low-pass filter. The coefficients may be designed to prevent change of part of the pixels. All the coefficients may be set to 1, for example, to operate the filter as an average value filter. For example, the predetermined value tc may be set in the same manner as the value used in a deblocking filter of H.264/AVC and H.265/HEVC. Specifically, the predetermined value tc may be calculated based on parameters for controlling quantization of each adjacent pixel block used in the decoder 101.

To sum up, the filter 103 is capable of suppressing distortion between the decoded pixel block and an upper pixel block adjacent to the decoded pixel block (that is, distortion in the horizontal direction) by performing filtering to serve as a low pass filter. The clipping in the Expression (1) may be omitted, and the calculated value A may be used as Q'(X, Y) without any processing.

FIG. 4 illustrates an image decoding apparatus 200 serving as a modification of the image decoding apparatus 100 according to the first embodiment. The image decoding apparatus 200 includes the decoder 101, the reference line memory 102, a first filter 201, and a second filter 202. The second filter 202 corresponds to the filter 103 of the image decoding apparatus 100. The image decoding apparatus 200 is different from the image decoding apparatus 100, in that the first filter 201 is added between the decoder 101 and the second filter 202. The following is an explanation of differences in operations in the units of the image decoding apparatus 200.

The decoder 101 decodes encoded data in units of pixel blocks using reference pixels to generate a decoded pixel block (a first decoded pixel block). The decoder 101 outputs the first decoded pixel block to the reference line memory 102 and the first filter 201. The decoder 101 also outputs the first decoded pixel block to the second filter 202 via the first filter 201. The decoder 101 may directly output the first decoded pixel block to the second filter 202.

The reference line memory 102 outputs reference pixels to the decoder 101 and the second filter 202.

The first filter 201 receives the first decoded pixel block from the decoder 101. The first filter 201 performs first filtering on the first decoded pixel block using the first decoded pixel block and a second decoded pixel block decoded directly before the first decoded pixel block, stored in the temporary buffer of the decoder 101, and adjacent to the first decoded pixel block. The first filter 201 outputs the first decoded pixel block on which the first filtering is performed to the second filter 202.

For example, the first filter 201 may perform an operation that is the same as, or similar to, the operation of a horizontal deblocking filter used in H.264/AVC or H.265/HEVC. Specifically, the first filter 201 performs filtering on a decoded pixel block Q of 4×4 pixels using the previously decoded pixel block P of 4×4 pixels. The first filter 201 may perform filtering on pixels included in the pixel block, for example, in accordance with the following Expression (2).

$$Q'(X, Y) = \text{clip}\left(\frac{\sum_{y=0}^{3}(d(Y, y) * P(X, y)) + \sum_{y=0}^{3}(e(Y, y) * Q(X, y)) + f(Y)}{\sum_{y=0}^{3}(d(Y, y) + e(Y, y))}, Q(X, Y) - tc, Q(X, Y) + tc\right) \quad (2)$$

In the Expression (2), Q'(X, Y) on the left side indicates Q(X, Y) filtered by using P(X, y). The clip(A, B, C) on the right side indicates clipping performed in the same manner as the Expression (1).

In the expression of the calculated value A, d(Y, y) indicates a coefficient for P(X, y), e(Y, y) indicates a coefficient for Q(X, y), and f(Y) indicates an offset in the position of a pixel Y. The coefficients d(Y, y) and e(Y, y) are determined by (Y) of Q(X, Y) to be filtered and (y) of Q(X, y) to be referred to, respectively. In the expression of the lower limit value B and the expression of the upper limit value C, tc is a value that is defined by the lower limit value B and the upper limit value C, and defines a variation width of the pixel value that is changed by filtering.

The coefficients and the offset are designed such that the filtering based on the Expression (2) is achieved by a low-pass filter. The above coefficients may be designed to prevent change of part of the pixels. All the above coefficients may be set to 1, for example, to operate the filter as an average value filter. For example, the predetermined value tc may be set in the same manner as the value used in a deblocking filter of H.264/AVC and H.265/HEVC. Specifically, the predetermined value tc may be calculated based on parameters for controlling quantization of each adjacent pixel block used in the decoder 101.

The first filter 201 may further perform first filtering on a previous decoded pixel block which is located on the left of the first decoded pixel block and on which filtering is performed. The previous decoded pixel block is stored in a temporary buffer (such as a flip-flop) of the first filter 201.

To sum up, the first filter 201 is capable of suppressing distortion between the decoded pixel block and a left pixel block adjacent to the decoded pixel block (that is, distortion in the perpendicular direction).

The second filter 202 receives a first decoded pixel block from the decoder 101, receives reference pixels from the reference line memory 102, and receives the first decoded pixel block on which the first filtering is performed from the first filter 201. The second filter 202 further performs filtering on the first decoded pixel block on which the first filtering is performed. Specific operations thereof are the same as those in the filter 103 of the image decoding apparatus 100, and explanation thereof is omitted. The second filter 202 outputs the decoded pixel block on which a plurality of processes are performed to an external device that is not illustrated, as the output pixel block. The second filter 202 may be disposed at a previous stage of the first filter 201, and the order of the filtering may be different.

As described above, the filter of the image decoding apparatus according to the first embodiment uses the reference pixels that are stored in the reference line memory and used for decoding processing also as information of pixels that are adjacent to the upper part of the decoded pixel block. With this structure, the image decoding apparatus needs no additional line memory for filtering, and enables suppression of an increase in the scale of the memory circuit.

In addition, in the image decoding apparatus according to the first embodiment, no filtering is performed on a pixel block located on the upper side of the decoded pixel block in filtering on the decoded pixel block. Accordingly, the image decoding apparatus is capable of instantly outputting a filtered pixel block, and enables suppression of output delay of the output pixel block.

(Second Embodiment)

As illustrated in FIG. 6, an image decoding apparatus 300 according to a second embodiment includes a decoder 101, a reference line memory 102, a filter 103, a calculator 301, a temporary buffer 302, and a determination unit 303. The image decoding apparatus 300 is different from the image decoding apparatus according to the first embodiment in that the image decoding apparatus 300 adaptively performs switching between a filtered decoded pixel block and a non-filtered decoded pixel block. The following is an explanation of differences in operations of the units from the image decoding apparatus according to the first embodiment.

The decoder 101 outputs a decoded pixel block to the reference line memory 102, the filter 103, the calculator 301, and the determination unit 303.

The filter 103 receives the decoded pixel block from the decoder 101, and receives reference pixels from the reference line memory 102. The filter 103 performs filtering on the decoded pixel block using the decoded pixel block and part of the reference pixels that are perpendicularly adjacent to the decoded pixel block in the scan direction of the image decoding processing. The filter 103 should use at least a one-pixel line of pixels extending in the scan direction and closest to the decoded pixel block, among the reference pixels. The filter 103 outputs the filtered decoded pixel block to the determination unit 303.

The calculator 301 receives the decoded pixel block from the decoder 101. The calculator 301 calculates a first value that indicates a variation quantity between pixels in the decoded pixel block, and a second value that indicates a variation quantity between pixels in a pixel block that is perpendicularly adjacent to the decoded pixel block and has been decoded. The calculator 301 outputs the first value to the determination unit 303, and outputs the second value to the temporary buffer 302.

FIG. 7A and FIG. 7B illustrate a pixel block used in the calculator 301. FIG. 7A is a diagram in which the decoded pixel block is viewed as a pixel block (lower adjacent pixel block) located on the lower side of an adjacent pixel block, and FIG. 7B is a diagram in which the decoded pixel block is viewed as a pixel block (upper adjacent pixel block) located on the upper side of an adjacent pixel block. The calculator 301 calculates the first value and the second value indicating respective variation quantities between pixels in the respective pixel blocks. The variation quantity may be calculated by using pixel values of pixels included in the pixel block.

The calculator 301 may calculate the first value of the lower adjacent pixel block, for example, in accordance with the following Expression (3).

$$wQ = |Q(0,2) - 2*Q(0,1) + Q(0,0)| + |Q(3,2) - 2*Q(3,1) + Q(3,0)| \quad (3)$$

In the Expression (3), wQ on the left side indicates a variation quantity (first value) of a pixel value between pixels in the lower adjacent pixel block. Q(X, Y) on the right side indicates a pixel value of a pixel in the shaded portion in FIG. 7A.

By contrast, the calculator 301 may calculate the second value of the upper adjacent pixel block, for example, in accordance with the following Expression (4).

$$wP = |Q(0,1) - 2*Q(0,2) + Q(0,3)| + |Q(3,1) - 2*Q(3,2) + Q(3,3)| \quad (4)$$

In the Expression (4), wP on the left side indicates a variation quantity (second value) of a pixel value between pixels in the upper adjacent pixel block. Q(X, Y) on the right side indicates a pixel value of a pixel in the shaded portion in FIG. 7B.

A pixel block having a large variation quantity of a pixel value between pixels is a pixel block including an edge and texture of the image with high probability, and a pixel block having a small variation quantity of a pixel value between pixels is a pixel block of a flat image with high probability. In addition, a pixel block of a flat image may lack information of pixels due to encoding. Further, when pixel blocks of flat images are adjacent to each other, block distortion may occur between the pixel blocks.

To sum up, the calculator 301 simultaneously calculates the first value and the second value from the decoded pixel block. The first value is output to the determination unit 303, and used instantly. The second value is stored in the temporary buffer 302 described later, until a decoding processing is performed on a pixel block located on the lower side of the decoded pixel block and the first value is calculated from the pixel block.

The temporary buffer 302 receives the second value from the calculator 301. The temporary buffer 302 stores the second value, until a decoding processing is performed on a pixel block located on the lower side of the decoded pixel block and the first value is calculated from the pixel block. At a timing at which the first value is calculated from the lower adjacent pixel block illustrated in FIG. 7A, the temporary buffer 302 outputs the second value of the upper adjacent pixel block corresponding to the lower adjacent pixel block to the determination unit 303.

The determination unit 303 receives the decoded pixel block from the decoder 101, and receives the filtered decoded pixel block from the filter 103. The determination unit 303 also receives the first value from the calculator 301, and receives the second value from the temporary buffer 302. The determination unit 303 determines which of the decoded pixel block and the filtered decoded pixel block should be output, using the first value and the second value. After the determination, the determination unit 303 outputs the determined one of the decoded pixel block and the filtered decoded pixel block to an external device that is not illustrated, as the output pixel block.

Specifically, the determination unit 303 outputs the filtered decoded pixel block when a sum of the first value and the second value is smaller than a threshold, and outputs the decoded pixel block when the sum of the first value and the second value is equal to or larger than the threshold. The second value used in the determination unit 303 is a value calculated from the past decoded pixel block that is located on the upper side of the decoded pixel block from which the first value is calculated. The threshold may be calculated based on parameters for controlling quantization of each adjacent pixel block used in the decoder 101. The determination method may be a method used in H.264/AVC and H.265/HEVC.

As a modification of the image decoding apparatus 300 according to the second embodiment, the calculator 301, the temporary buffer 302, and the determination unit 303 may be added to the image decoding apparatus 200. The determination unit 303 determines which of the decoded pixel block and the decoded pixel block on which first filtering and second filtering are performed should be output. The determination unit 303 outputs one of the decoded pixel block and the decoded pixel block on which first filtering and second filtering are performed to an external device that is not illustrated, as the output pixel block.

As another modification, a second calculator and a second determination unit may be further added to the image decoding apparatus corresponding to the above modification of the image decoding apparatus 300. The second calculator calculates a variation quantity between pixels in the decoded pixel block, and a variation quantity between pixels in the previously decoded pixel block located on the left of the pixel block. The second determination unit determines which of the decoded pixel block and the decoded pixel block on which second filtering is performed should be output. The second determination unit outputs one of the decoded pixel block and the decoded pixel block on which second filtering is performed to the first filter 201, as an intermediate pixel block. The first filter 201 performs the first filtering described above on the intermediate pixel block.

As described above, the image decoding apparatus according to the second embodiment includes additional processing added to the image decoding apparatus according to the first embodiment. In the additional processing, it is determined which of the decoded pixel block and the filtered decoded pixel block should be output. With this structure, the image decoding apparatus can avoid processing on a region on which filtering should not be performed, and thus is expected to improve the subjective image quality of the output pixel block.

The image decoding apparatus is also capable of calculating in advance a variation quantity between pixels used for determination processing on a pixel block located on the lower side of the decoded pixel block. A temporary buffer that stores variation quantities between pixels has a memory circuit scale smaller than that of a memory for storing pixel blocks. For this reason, the image decoding apparatus requires no memory with a large memory circuit scale to store pixel blocks, and suppresses an increase in the memory circuit scale.

(Third Embodiment)

Figure 8:
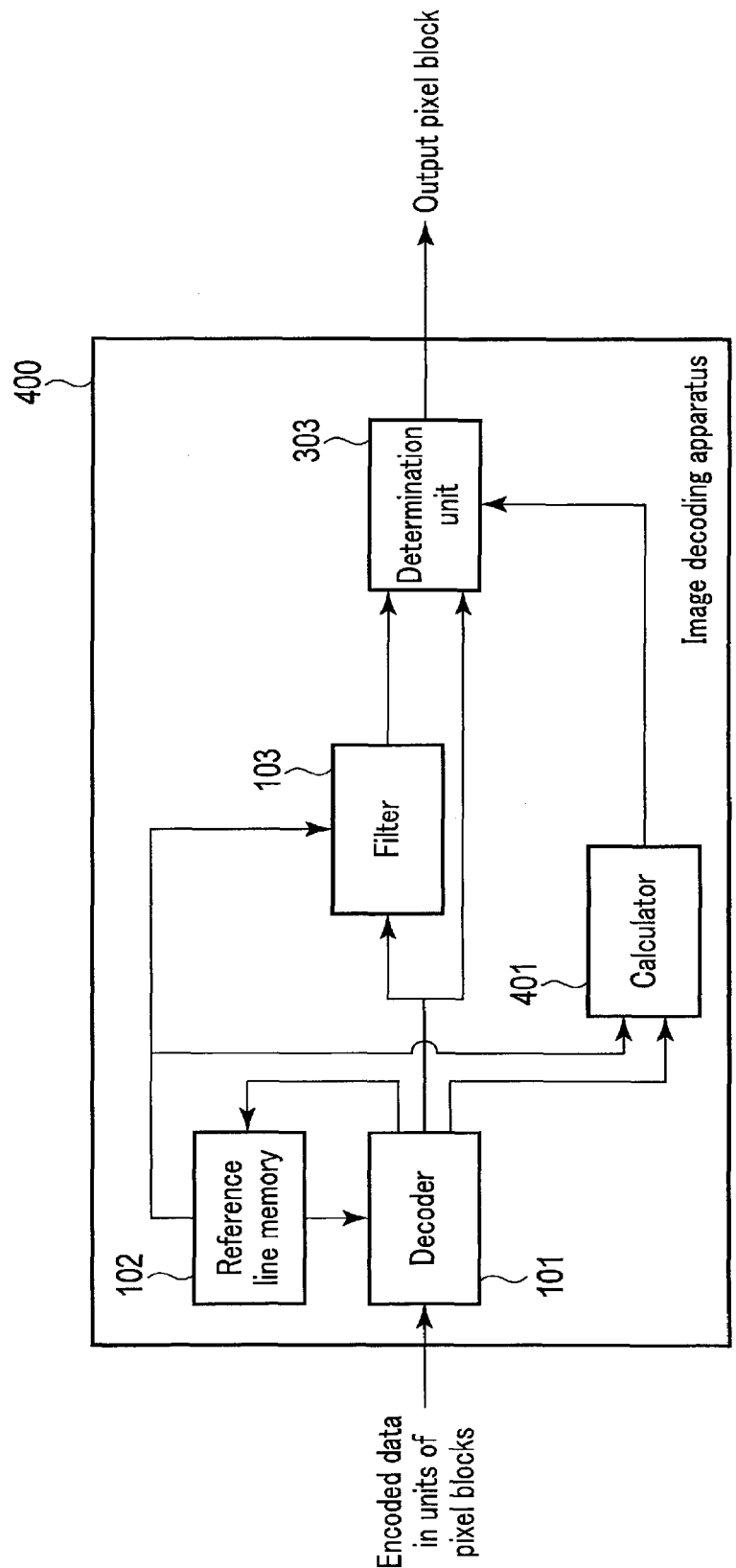
FIG. 8 is a block diagram illustrating an image decoding apparatus according to a third embodiment.

As illustrated in FIG. 8, an image decoding apparatus 400 according to a third embodiment includes a decoder 101, a reference line memory 102, a filter 103, a determination unit 303, and a calculator 401. The image decoding apparatus 400 is different from the image decoding apparatus according to the second embodiment, in that the image decoding apparatus 400 does not include a temporary buffer 302. The following is an explanation of differences in operations in the units from the image decoding apparatus according to the second embodiment.

The decoder 101 outputs a decoded pixel block to the reference line memory 102, the filter 103, the calculator 401, and the determination unit 303.

The reference line memory 102 outputs reference pixels to the decoder 101, the filter 103, and the calculator 401.

The calculator 401 receives the decoded pixel block from the decoder 101, and receives the reference pixels from the reference line memory 102. The calculator 401 calculates a first value indicating a variation quantity between pixels in the decoded pixel block, and a second value indicating a variation quantity between pixels of reference pixels adjacent to the decoded pixel block. The calculator 401 outputs the first value and the second value to the determination unit 303.

Figure 9:
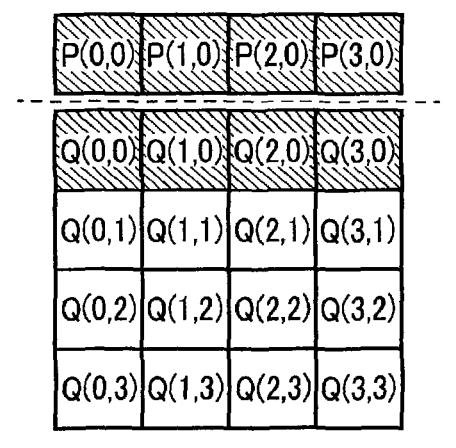

Specifically, as illustrated in FIG. 9, the calculator 401 may calculate the first value and the second value using a pixel line P of 1×4 pixels, and a line of 1×4 pixels in a decoded pixel block Q adjacent to the pixel line P. The calculator 401 may calculate the first value and the second value indicating variation quantities of pixel values of adjacent pixels, for example, in accordance with the following Expression (5) and Expression (6), respectively.

$$wQ=|Q(0,0)-Q(1,0)|+|Q(1,0)-Q(2,0)|+|Q(2,0)-Q(3,0)| \quad (5)$$

$$wP=|P(0,0)-P(1,0)|+|P(1,0)-P(2,0)|+|P(2,0)-P(3,0)| \quad (6)$$

In the Expression (5), wQ on the left side indicates the first value in the shaded portion of the decoded pixel block Q. In the Expression (6), wP on the left side indicates the second value in the shaded portion of the pixel line P.

The calculator 401 may calculate a variation quantity using pixels different from the pixels in the shaded portion of FIG. 9, or may calculate a variation quantity using part of the pixels in the shaded portion. The calculator 401 may also calculate the first variation quantity using the Expression (3) instead of the Expression (5).

The determination unit 303 receives the decoded pixel block from the decoder 101, and receives the filtered decoded pixel block from the filter 103. The determination unit 303 also receives the first value and the second value from the calculator 401.

As a modification of the image decoding apparatus 400 according to the third embodiment, the determination unit 303 and the calculator 401 may be added to the image decoding apparatus 200. As another modification, the second calculator and the second determination unit may be further added to the image decoding apparatus corresponding to the above modification of the image decoding apparatus 400. Specific operations thereof are the same as those in the modification of the second embodiment, and explanation thereof is omitted.

As described above, the image decoding apparatus according to the third embodiment uses a calculation method different from that of the calculator in the second embodiment described above, and thus requires no temporary buffer to store a variation quantity between pixels of a pixel block. Accordingly, the image decoding apparatus suppresses an increase in the memory circuit scale.

In each of the embodiments described above, the image decoding apparatus may store part of pixels of the filtered decoded pixel block in the reference line memory, and may perform loop filtering. Such loop filtering is, expected to improve the prediction performance and the encoding efficiency, because an image with block distortion removed is used in intra prediction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image decoding apparatus comprising:
   a memory that stores reference pixels based on pixels included in a decoded pixel block;
   a decoder that decodes encoded data in units of pixel blocks using the reference pixels to generate a first decoded pixel block, the first decoded pixel block being adjacent to the reference pixels;
   a first filter that performs a first filtering on only the first decoded pixel block using the first decoded pixel block and part of the reference pixels perpendicularly adjacent to the first decoded pixel block in a scan direction of image decoding processing; and
   a second filter that performs a second filtering on the first decoded pixel block on which the first filtering has been performed, the first filtering performed using the first decoded pixel block and a second decoded pixel block, the second decoded pixel block being decoded directly before the first decoded pixel block and adjacent to the first decoded pixel block.

2. The apparatus according to claim 1, wherein
   the first filter uses at least a one-pixel line extending in the scan direction and closest to the first decoded pixel block, among the reference pixels perpendicularly adjacent to the first decoded pixel block in the scan direction.

3. The apparatus according to claim 1, wherein
   the memory stores at least a one-pixel line extending in the scan direction and closest to a non-decoded pixel block, among the reference pixels perpendicularly adjacent to the non-decoded pixel block in the scan direction.

4. The apparatus according to claim 1, wherein
the second filter performs the second filtering on the second decoded pixel block.

5. The apparatus according to claim 1, further comprising:
a calculator that calculates a first value indicating a variation quantity between pixels in the first decoded pixel block, and a second value indicating a variation quantity between pixels in a third decoded pixel block perpendicularly adjacent to the first decoded pixel block in the scan direction and having been decoded; and
a determination unit that determines which of the first decoded pixel block and the filtered first decoded pixel block is output, using the first value and the second value.

6. The apparatus according to claim 5, wherein
the determination unit determines to output the filtered first decoded pixel block, when a sum of the first value and the second value is smaller than a threshold.

7. The apparatus according to claim 1, further comprising:
a calculator that calculates a first value indicating a variation quantity between pixels in the first decoded pixel block, and a second value indicating a variation quantity between pixels in the reference pixels adjacent to the first decoded pixel block; and
a determination unit that determines which of the first decoded pixel block and the filtered first decoded pixel block is output, using the first value and the second value.

8. An image decoding method comprising:
storing, in a memory, reference pixels based on pixels included in a decoded pixel block;
decoding encoded data in units of pixel blocks using the reference pixels to generate a first decoded pixel block, the first decoded pixel block being adjacent to the reference pixels;
performing a first filtering on only the first decoded pixel block using the first decoded pixel block and part of the reference pixels perpendicularly adjacent to the first decoded pixel block in a scan direction of image decoding processing; and
performing a second filtering on the first decoded pixel block on which the first filtering has been performed, the first filtering performed using the first decoded pixel block and a second decoded pixel block, the second decoded pixel block being decoded directly before the first decoded pixel block and adjacent to the first decoded pixel block.

9. The method according to claim 8, wherein
the performing the first filtering uses at least a one-pixel line extending in the scan direction and closest to the first decoded pixel block, among the reference pixels perpendicularly adjacent to the first decoded pixel block in the scan direction.

10. The method according to claim 8, wherein
the storing in the memory stores at least a one-pixel line extending in the scan direction and closest to a non-decoded pixel block, among the reference pixels perpendicularly adjacent to the non-decoded pixel block in the scan direction.

11. The method according to claim 8, wherein
the second filtering is performed on the second decoded pixel block.

* * * * *